(12) United States Patent
Horng et al.

(10) Patent No.: US 8,997,593 B2
(45) Date of Patent: Apr. 7, 2015

(54) NUT FOR BALL SCREW

(75) Inventors: Jeng-Haur Horng, Yunlin County (TW);
Shin-Yuh Chen, Yunlin County (TW);
Jen-Fin Lin, Yunlin County (TW);
Chin-Chung Wei, Yunlin County (TW);
Hsiao-Yeh Chu, Yunlin County (TW);
Yuh-Ping Chang, Yunlin County (TW);
Wang-Long Li, Yunlin County (TW)

(73) Assignee: National Formosa University, Yunlin County (TW)

( * ) Notice: Subject to any disclaimer, the term of this patent is extended or adjusted under 35 U.S.C. 154(b) by 390 days.

(21) Appl. No.: 13/614,083

(22) Filed: Sep. 13, 2012

(65) Prior Publication Data
US 2013/0145877 A1 Jun. 13, 2013

(30) Foreign Application Priority Data

Dec. 7, 2011 (TW) .............................. 100223108 U

(51) Int. Cl.
*F16H 25/24* (2006.01)
*F16H 57/04* (2010.01)

(52) U.S. Cl.
CPC ............ *F16H 25/24* (2013.01); *F16H 57/0416* (2013.01); *F16H 57/0497* (2013.01); *Y10T 74/19702* (2013.01)

(58) Field of Classification Search
USPC ........................ 74/424.71, 89.4, 89.41, 89.43
See application file for complete search history.

(56) References Cited

U.S. PATENT DOCUMENTS

| | | | | |
|---|---|---|---|---|
| 5,885,057 A * | 3/1999 | Wootten | ........................... | 415/73 |
| 7,958,796 B2 * | 6/2011 | Hsu et al. | ..................... | 74/89.23 |
| 8,272,286 B2 * | 9/2012 | Aso et al. | ....................... | 74/89.4 |
| 2010/0206102 A1 * | 8/2010 | Aso et al. | ....................... | 74/89.4 |
| 2013/0145877 A1 * | 6/2013 | Horng et al. | ............... | 74/424.71 |
| 2013/0312555 A1 * | 11/2013 | Yamasaki | .................... | 74/89.34 |
| 2014/0230584 A1 * | 8/2014 | Hudson et al. | ............... | 74/89.23 |

* cited by examiner

*Primary Examiner* — David M Fenstermacher
(74) *Attorney, Agent, or Firm* — Rosenberg, Klein & Lee

(57) ABSTRACT

A nut for a ball screw mainly includes a nut, multiple dual-narrowed paths, multiple micro fans, a control portion, and multiple temperature sensing portions. The nut has a threaded path and the dual-narrowed paths are defined through the central axis of the nut and substantially parallel to the threaded path. Each of the dual-narrowed paths has a high-speed area and the diameter of each of the dual-narrowed paths is gradually reduced from two ends toward the high-speed area. The nut has micro fans which drive the air flows and reduce the temperature to increase the life of use and the precision of positioning.

7 Claims, 13 Drawing Sheets

NUT FOR BALL SCREW

FIELD OF THE INVENTION

The present invention relates to a nut for a ball screw, and more particularly, to a nut with a dual-narrowed path so as to reduce the increment of temperature, resistance and weight, and increase precise positioning and life of use.

BACKGROUND OF THE INVENTION

The ball screws are used in the movable platforms of high-precision machines and are important parts for precision industry.

The conventional ball screw 90 is rotated to linearly transmit a nut 910 mounted to the ball screw 90 and heat is generated during the transmission due to friction between the nut 910 and the ball screw 90. The maximum temperature is located at the center of the nut 90 wherein the balls 952 are in contact with, the maximum temperature area is designated as the max-temp area 910A. As show in FIG. 13, the temperature gradually drops from the max-temp area 910A toward two ends of the nut 910, wherein the levels of the temperature are shown by the density of the bars and the max-temp area 910A is shown by the highest density of the bars.

When the temperature of the nut 910 is increased, the heat affects the length of the nut 910 so that it cannot be precisely positioned and the precision of positioning of the system fails. It is obvious that the temperature affects the precision and the positioning so that the nut 901 needs to be reduced.

The present invention intends to provide a nut for ball screws and the nut improves the shortcomings of the conventional nuts.

SUMMARY OF THE INVENTION

The present invention relates to a nut for a ball screw. It comprises:

a nut having an outer surface and a threaded path defined, through the nut, and multiple dual-narrowed paths located between the threaded path and the outer surface of the nut, the dual-narrowed paths defined through a central axis of the nut and substantially being parallel, to the threaded path, each of the dual-narrowed paths having a high-speed area and two low-speed areas, the high-speed area located between the two low-speed areas, a diameter of each of the dual-narrowed paths being reduced from two ends toward the high-speed area:

multiple micro fans disposed in the dual-narrowed paths so as to drive air flows in the dual-narrowed paths to reduce temperature;

a control portion to control operation of the micro fans; and multiple temperature sensing portions disposed between the threaded path and the outer surface of the nut to sense temperature, the control portion connected with the temperature sensing portions so as to individually control the micro fans.

The primary object of the present invention is to provide a nut for a ball screw to reduce the increment of temperature, resistance and weight, and increase precise positioning and life of use.

The present invention will become more obvious from the following description when taken in connection with the accompanying drawings which show, for purposes of illustration only, a preferred embodiment in accordance with the present invention.

DETAILED DESCRIPTION OF THE PREFERRED EMBODIMENT

Figure 1:
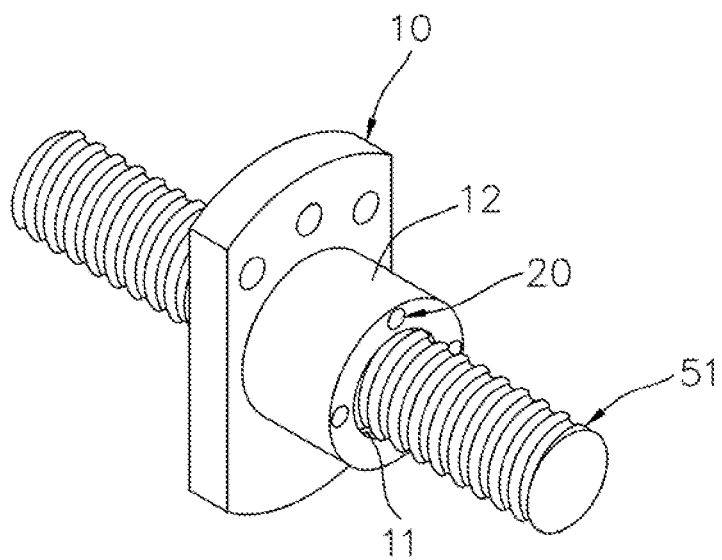
FIG. 1 is a perspective view to show that the nut of the present invention is mounted to the ball screw.
Figure 2:
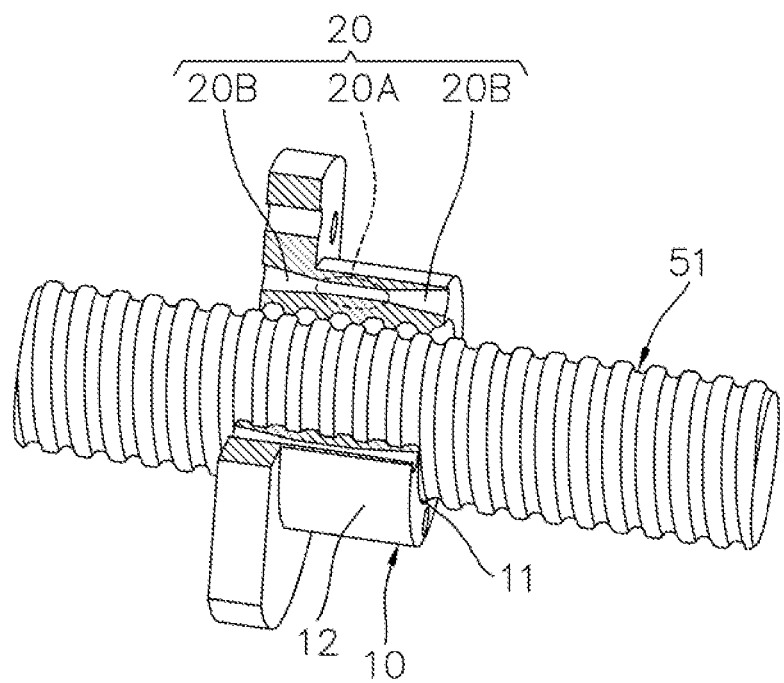
FIG. 2 is a partial cross sectional view to show the nut of the present invention mounted to the ball screw.

Referring to FIGS. 1, 2, 3, 4A and 4B, the present invention relates to a nut for a ball screw. It mainly comprises a nut 10, multiple dual-narrowed paths 20, multiple micro fans 30, a control portion 40, and multiple temperature sensing portions 60.

About the nut 10, it comprises an outer surface 12 and a threaded path 11 which is defined through the nut 10.

Figure 4A:
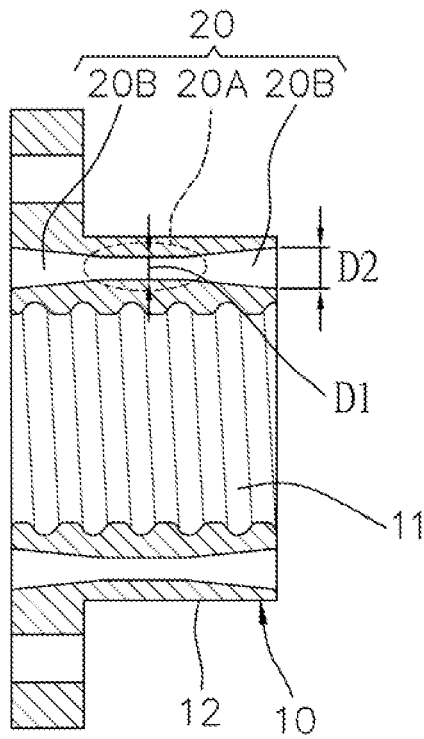
FIG. 4A is a cross sectional view to show the nut of the present invention where multiple micro fans, a control portion, and multiple temperature sensing portions are not shown.
Figure 4B:
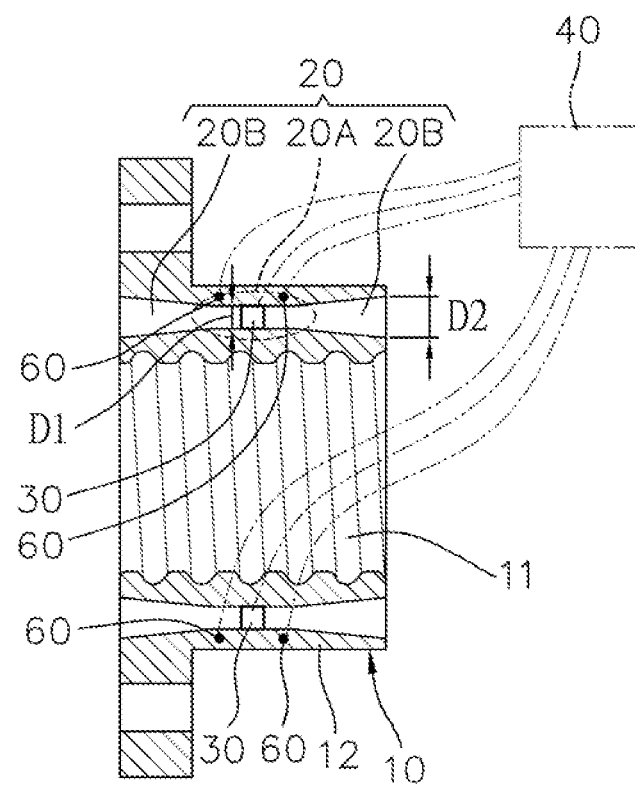
FIG. 4B is a cross sectional view to show the nut of the present invention where multiple micro fans, a control portion, and multiple temperature sensing portions are shown.

With regard to the multiple dual-narrowed paths 20, they are located between the threaded path 11 and the outer surface 12 of the nut 10, and the dual-narrowed paths 20 are defined through the central axis of the nut 10 and substantially being parallel to the threaded path 11. Each of the dual-narrowed paths 20 has a high-speed area 20A and two low-speed areas 20B, wherein the high-speed area 20A is located between the two low-speed areas 20B. The diameter of each of the dual-narrowed paths 20 is gradually reduced from two ends (the low-speed areas 20B) toward the high-speed area 20A. As shown in FIGS. 4A and 4B, the diameter of the high-speed area 20A is designated as D1 and the diameter of each of the two ends is designated as D2. In this case, there are four dual-narrowed paths 20 located at even distance from each other along the nut 10.

Concerning the multiple micro fans 30, they are disposed in the dual-narrowed paths 20 so as to drive air flows in the dual-narrowed paths 20 to reduce temperature.

About the control portion 40, it is provided to control operation of the micro fans 30.

About the multiple temperature sensing portions 60, they are disposed between the threaded path 11 and the outer surface 12 or the nut 10 to sense temperature. The control portion 40 is connected with the temperature sensing portions 60 so as to individually control the micro fans 30.

Figure 3:
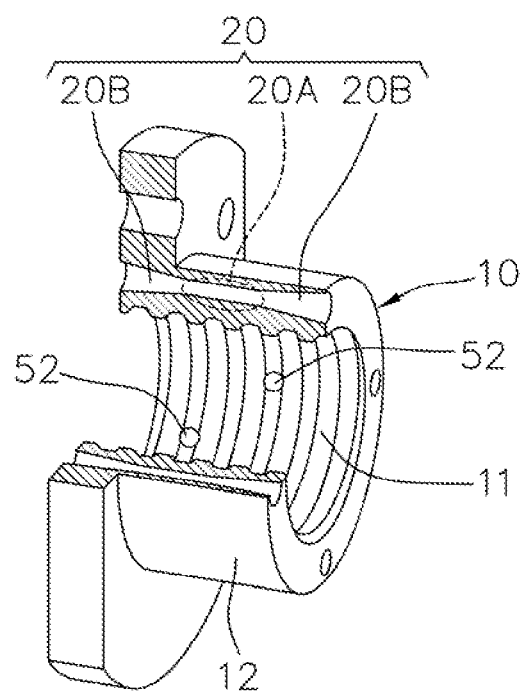
FIG. 3 is a partial cross sectional view to show the nut of the present invention.

In detail, the nut 10 is threadedly mounted to the ball screw 51 by the threaded path 11 and multiple balls 52 are located between the nut 10 and the ball screw 51. By rotating the ball screw 51, the nut 10 moves linearly. The balls 52 are generally located between the nut 10 and the ball screw 51 consecutively, as shown in FIG. 3, only two balls 52 are shown.

Figure 5:
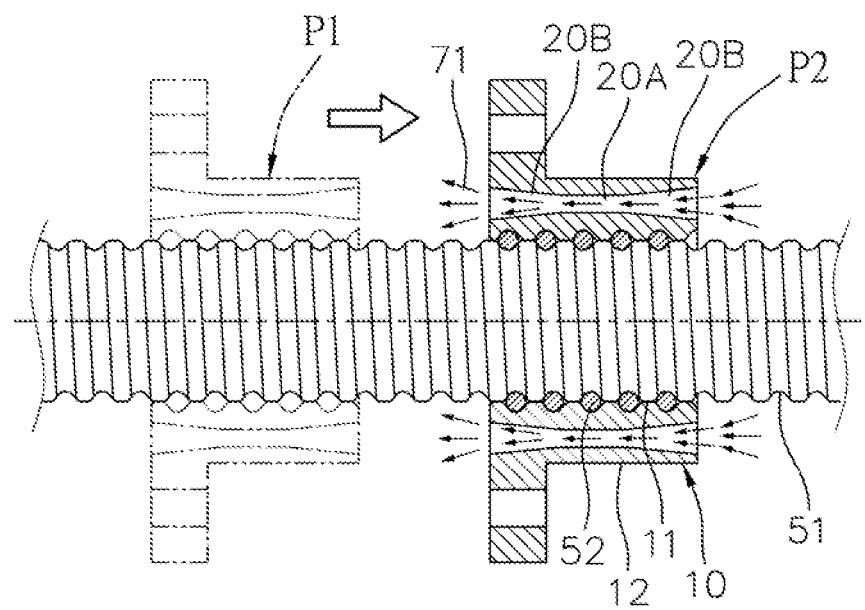
FIG. 5 shows the direction that the air flows when the nut of the present invention is moving on the ball screw.

As shown in FIG. 5, when the nut 10 moves linearly on the ball screw 51 from first position P1 to the second position P2, the air 71 passes through the dual-narrowed paths 20 to reduce the resistance when the nut 10 is moving, and the low resistance also saves the input energy required.

Figure 6:
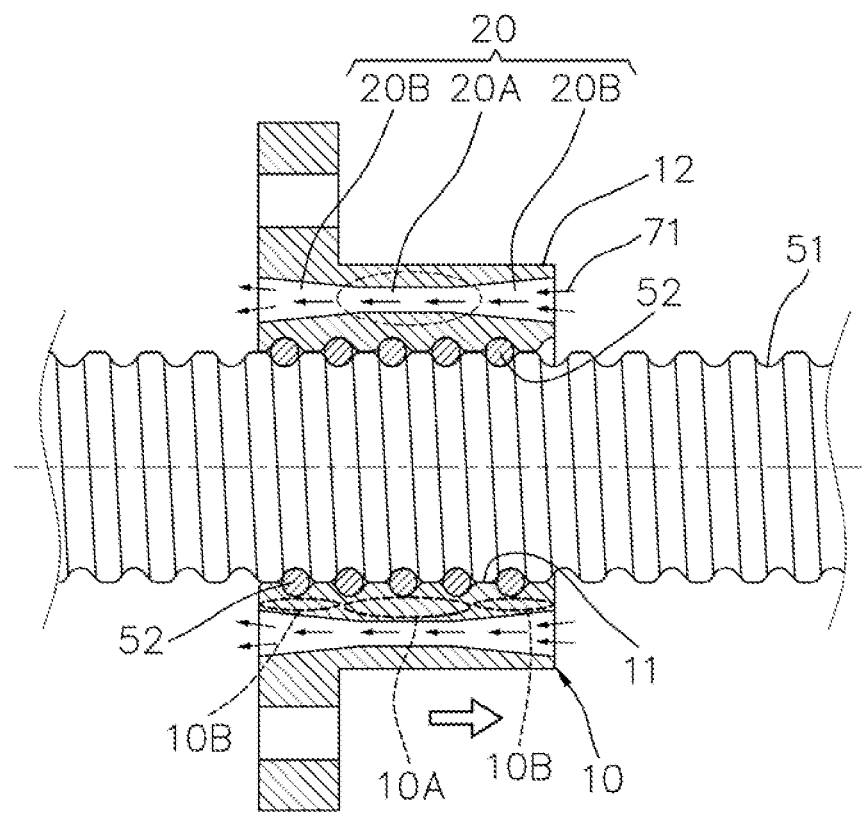
FIG. 6 shows the temperature and the speed of the air flows of the nut of the present invention mounted to the ball screw.

As shown in FIG. 6, when the nut 10 is moved by the rotation of the ball screw 51, temperature increases due to the friction and the central portion of the nut 10 forms the max-temp area 10A and the two ends are the general temperature raisin areas 10B. Because the diameters on the two ends are larger than the diameter at the central portion, so that when the air 71 passes through the central portion, the sped of the air 71 is higher than that of the two ends so as to increase the coefficient of heat convection "h" to form the high-speed area 20A. The speed of the two ends is low so that the coefficient of heat convection "h" is low so as to form the low-speed areas 20B. The high-speed area 20A is located corresponding to the max-temp area 10A of the nut 10 such that the temperature drops quickly (the higher that air flow moves, the larger scale the temperature drops). The low-speed areas 20B are located corresponding to the general temperature raising areas 10B of the nut 10 (the temperature drop for the low-speed areas 20B is lower than that of the high-speed area). Therefore, the nut reaches balance of temperature. The dual-narrowed paths 20 reduce the temperature of the nut 10 and further reach the balance of temperature.

Because the nut is used for precision transmission so that it does not bear load, the dual-narrowed paths 20 do not affect the strength of the nut and reduces the weight of the nut 10 as well. The required input energy is also reduced because of the light in weight.

When the temperature of the nut 10 increases, the heat effect affects the length of the nut 10 and affects the positioning of the system. Therefore, by the dual-narrowed paths 20, the temperature of the nut 10 is reduced when it moves so that the precision for positioning is increased and the impact of heat affect can also be reduced. The life of use is prolonged (the factors affecting the life of use includes the temperature of friction and lubricant oil, viscosity of the lubricant oil reduces when the temperature increases and the film of the lubricant oil breaks, and this may result in burn). Also, the dual-narrowed paths 20 are able to reduce the temperature of the lubricant oil.

Figure 7A:
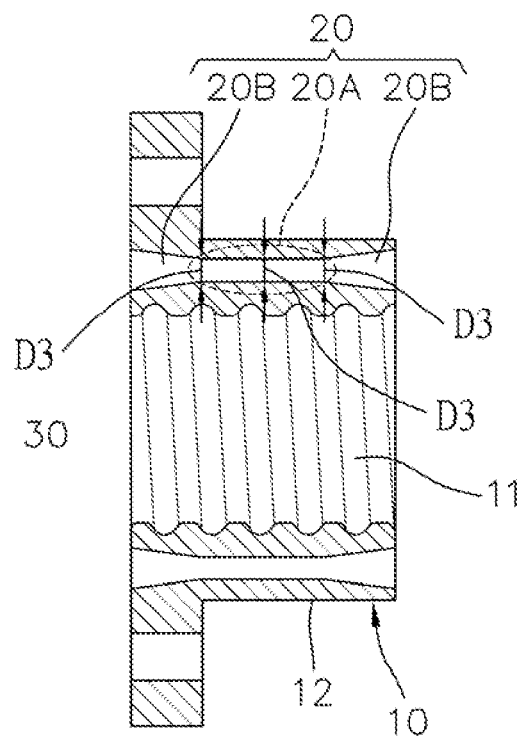
FIG. 7A shows the high speed area of the nut of the present invention.
Figure 7B:
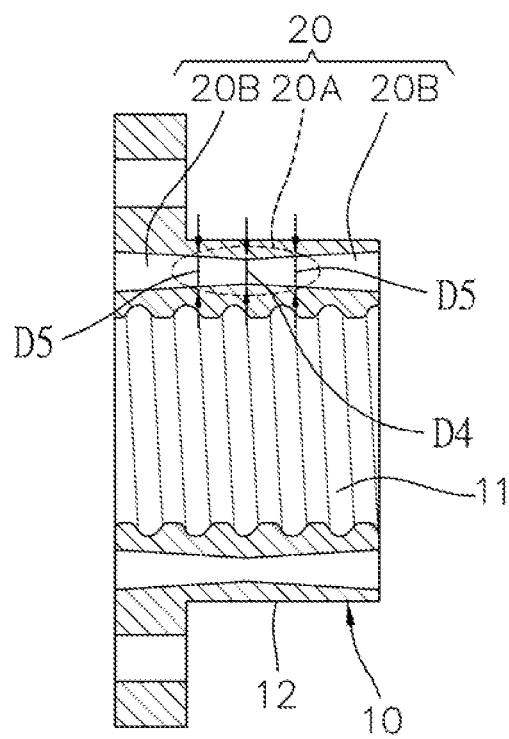
FIG. 7B shows another case of the high speed area of the nut the present invention.
Figure 8A:
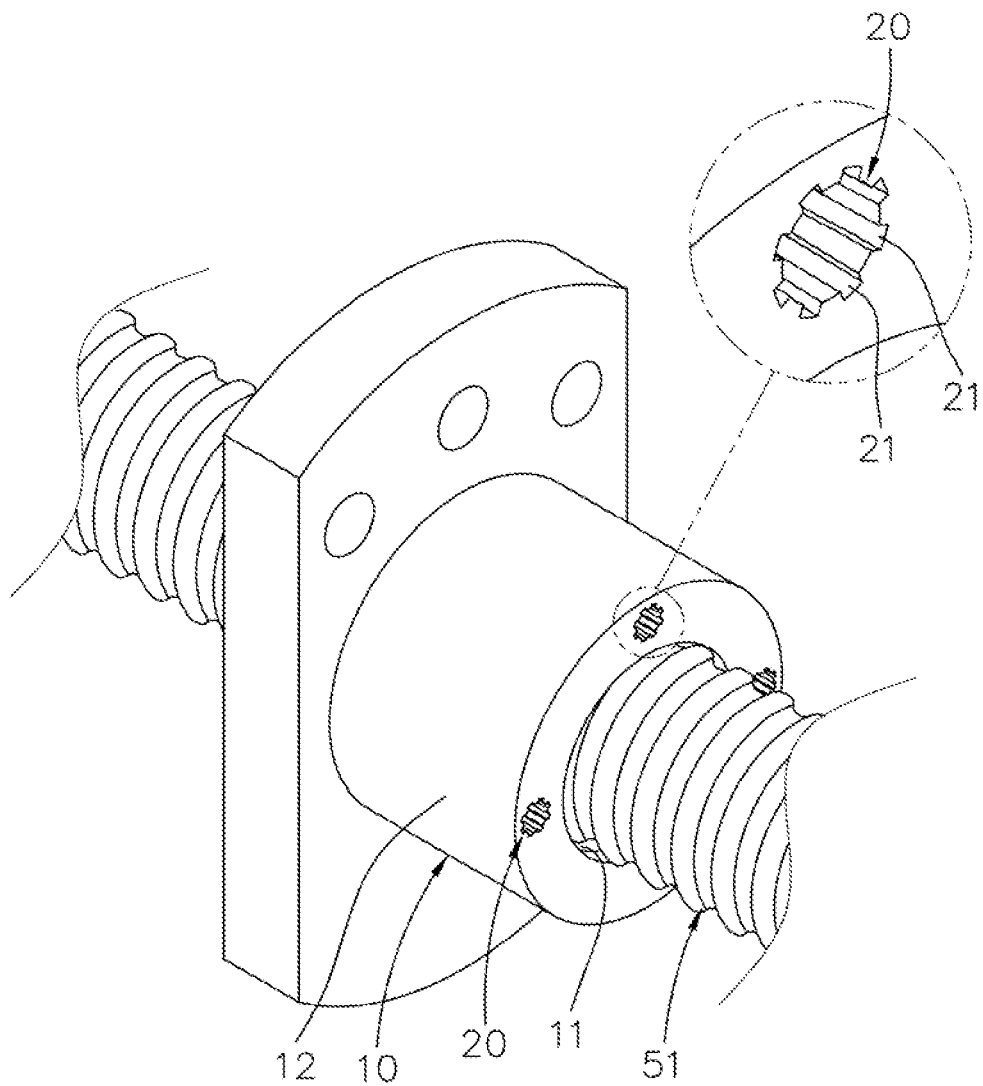
FIG. 8A shows the recesses of the nut of the present invention.
Figure 8B:
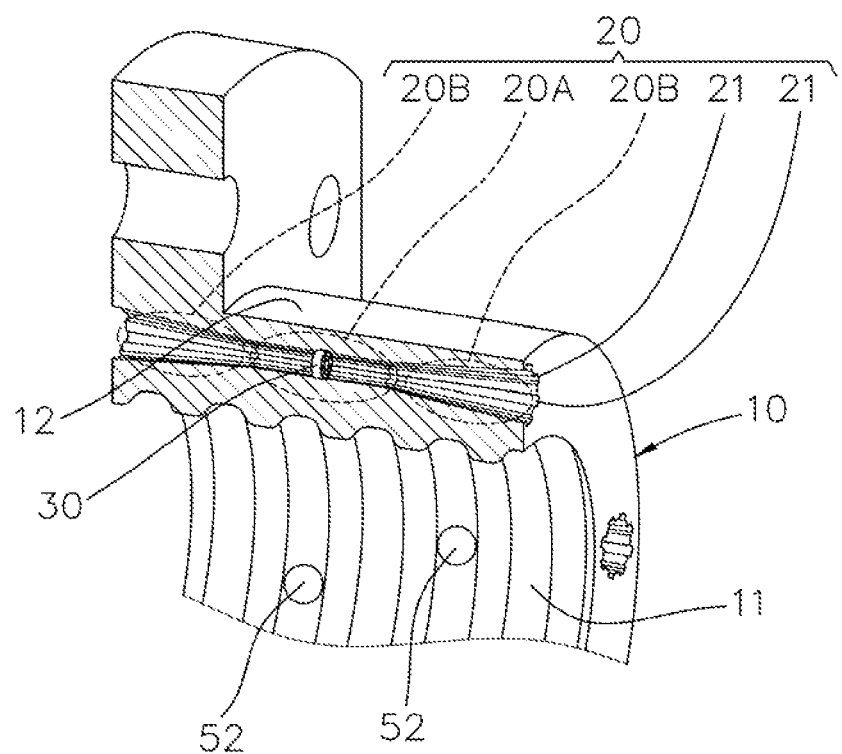
FIG. 8B shows the partial cross sectional view of the recesses in FIG. 8A.

As shown in FIG. 7A, the diameter of the high-speed area 20A of each of the dual-narrowed paths 20 is a fixed diameter. The diameter of the two low speed areas 20b and the high-speed area 20A is the same and designated as D3. As shown in FIG. 7B, the diameter of the high-speed area 20A of each of the dual-narrowed paths 20 is reduced toward a center thereof and the diameters connected to the two low-speed areas 20B are designated as D5. The diameter of the narrowing area toward the central portion is designated as Furthermore, in order to increase the total contact area (to enhance the heat transfer effect each of the dual-narrowed paths 20 can further comprise multiple recesses 21 defined in the inner periphery thereof. As shown in FIGS. 8A and 8B, each of the dual-narrowed paths 20 has eight recesses 21 which are located at even distance to each other and extend along the axial direction of the dual-narrowed paths 20. The recesses 21 are axially straight slots.

The forms of the recesses 21 can be different instead of axially straight slots as shown in FIGS. 8A and 8B.

Figure 9A:
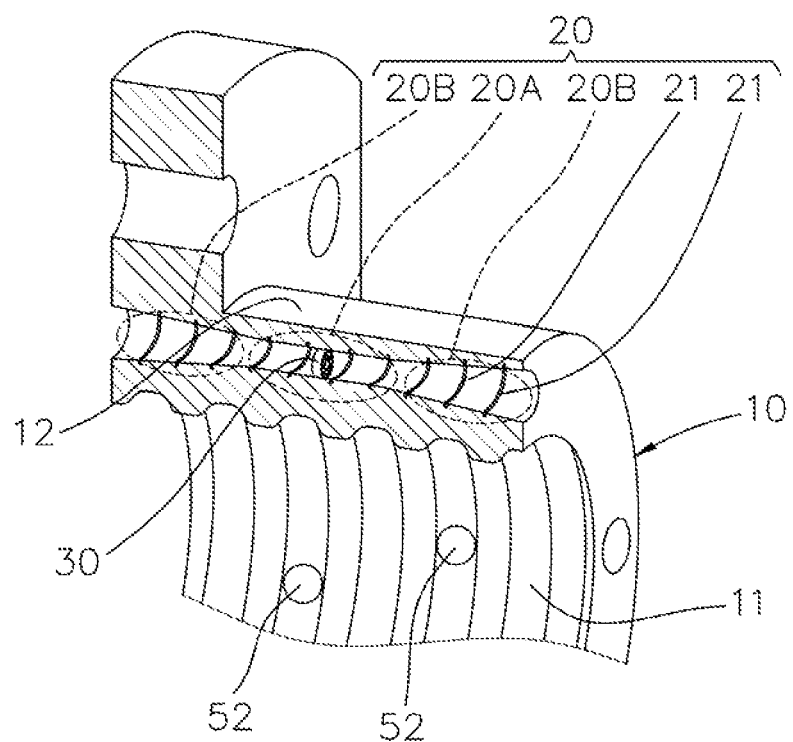
FIG. 9A shows the partial cross sectional view of the second type of the recesses of the nut of the present invention.

As shown in FIG. 9A, the recesses 21 are substantially parallel annular grooves along the dual-narrowed paths 20 and the change of the diameter of the recesses 21 is varied along with the change of diameter of the dual-narrowed paths 20.

Figure 9B:
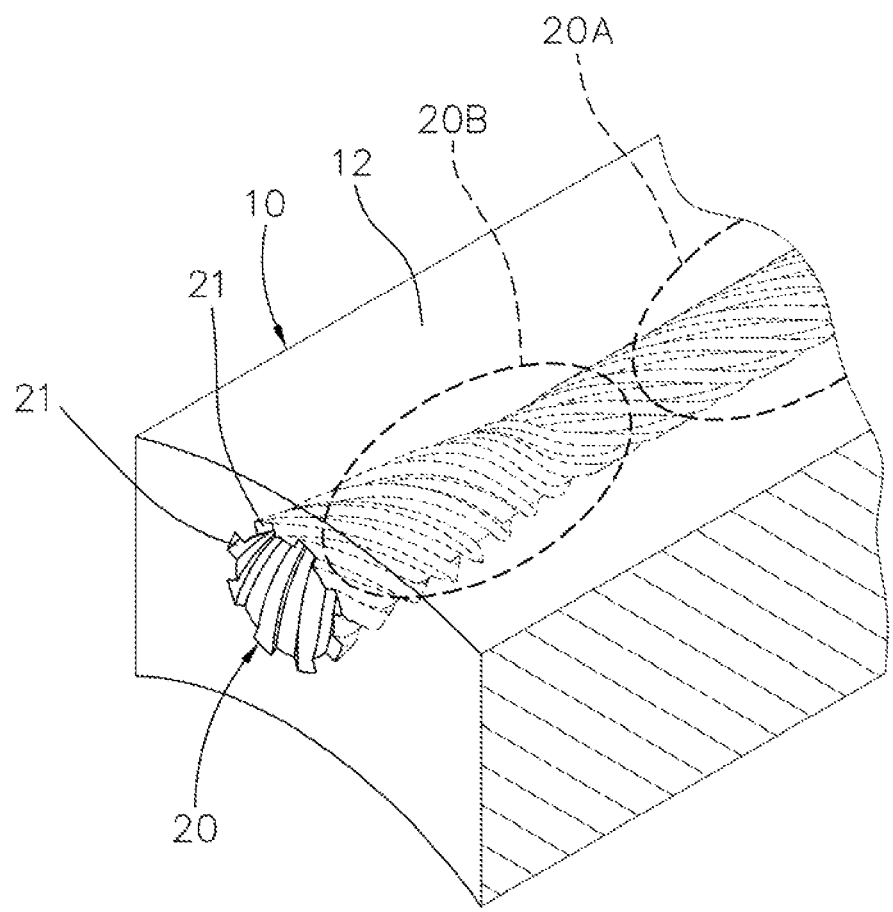
FIG. 9B shows the third type of the recesses of the nut of the present invention.
Figure 9C:
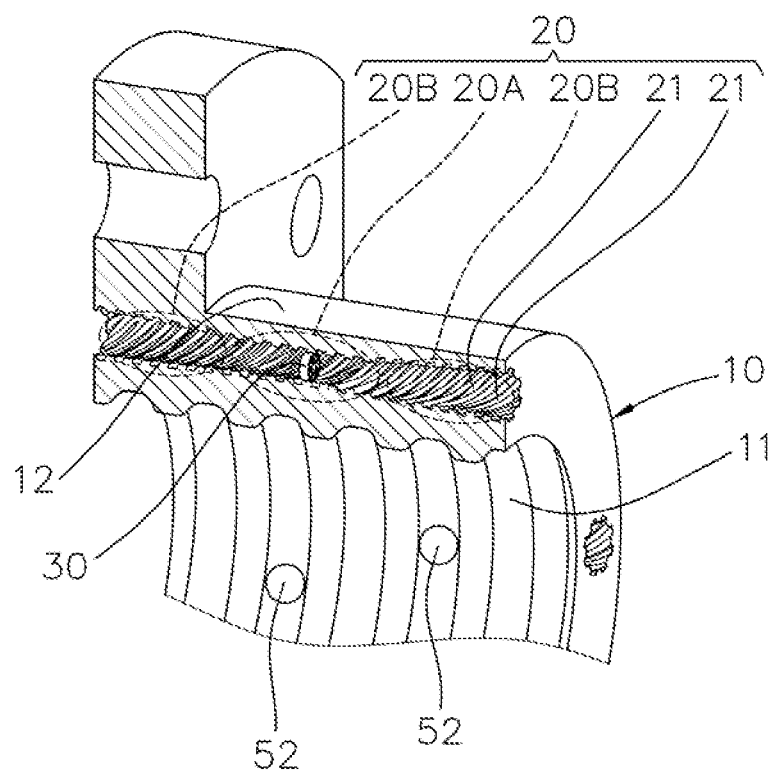
FIG. 9C shows the partial cross sectional view of the third type of the recesses of the nut of the present invention.

As shown in FIGS. 9B and 9C, the eight recesses 21 are formed spirally (like spirally grooves) in the dual-narrowed paths 20 (generating more air turhulences)

The recesses 21 increase the contact area with the air when the air passes through the dual-narrowed paths 20. The larger the contact area is, the larger amount heat is brought away by the air. The contact area that the dual-narrowed paths 20 increase is the sum of the sides of each of the recesses 21.

Figure 10:
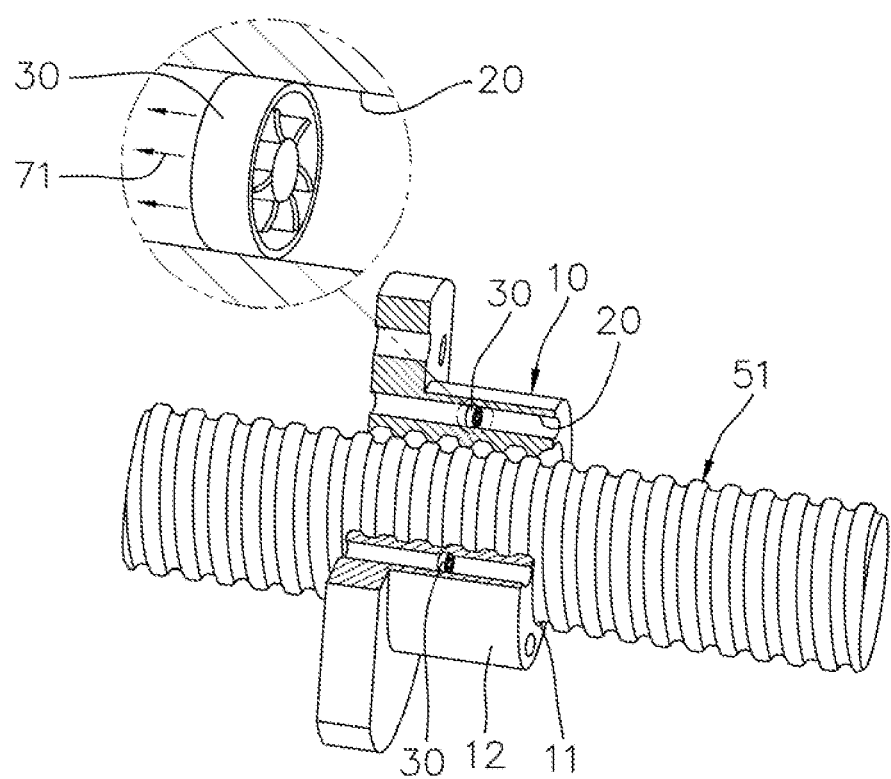
FIG. 10 shows the micro fans of the present invention.

In addition, as shown in FIG. 10, about the multiple micro fans 30, they are disposed in the dual-narrowed paths 20 so as to drive air flows in the dual-narrowed paths 20 to reduce temperature. The micro fans 30 drive the air 71 in the dual-narrowed paths 20 to reduce the temperature, similar to the fans installed in the laptops.

Referring to FIG. 10, the micro fans 30 are installed to the general the dual-narrowed paths 20, however the micro fans 30 can also be installed to the dual-narrowed paths 20 with recesses 21.

Figure 11:
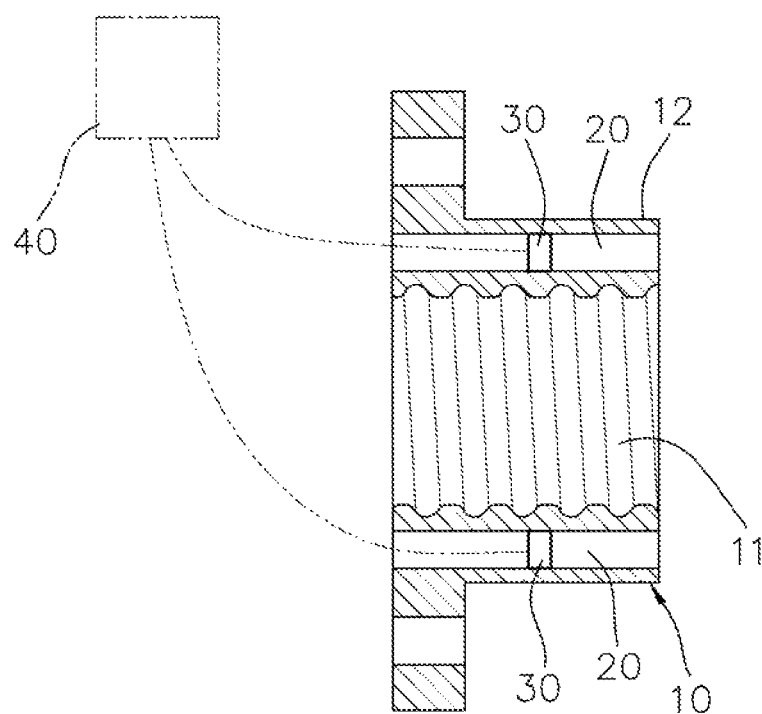
FIG. 11 shows the control portion of the present invention.

As shown in FIG. 11, the control portion 40 is provided to control operation of the micro fans 30. The micro fans 30 can be operated at three speeds (such OFF, Low speed, and High speed) or more speeds. And, the users can use the control portion 40 to control the fan speed as needed.

Figure 12:
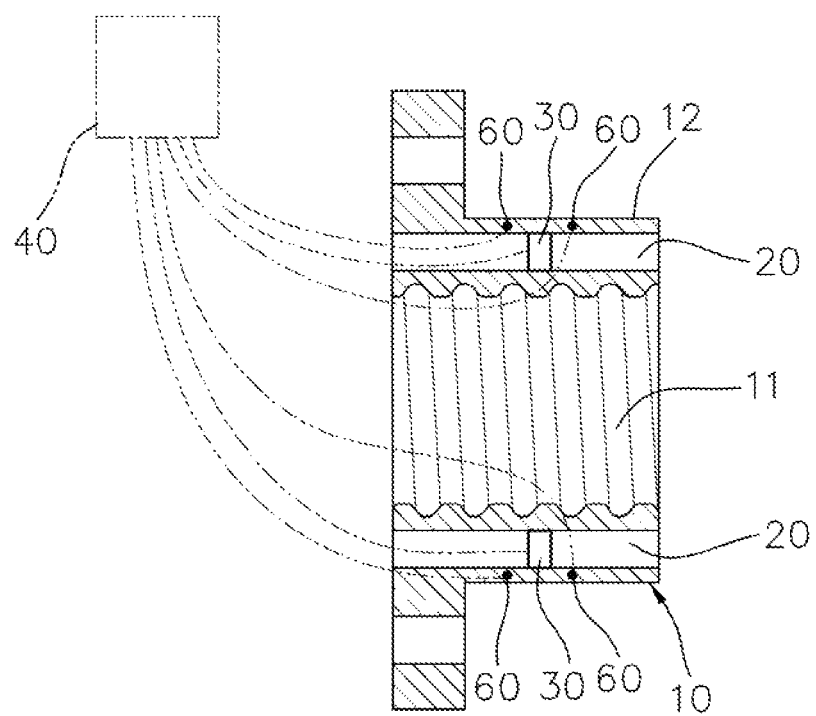
FIG. 12 shows the control portion and the temperature sensing portions of the present invention.
Figure 13:
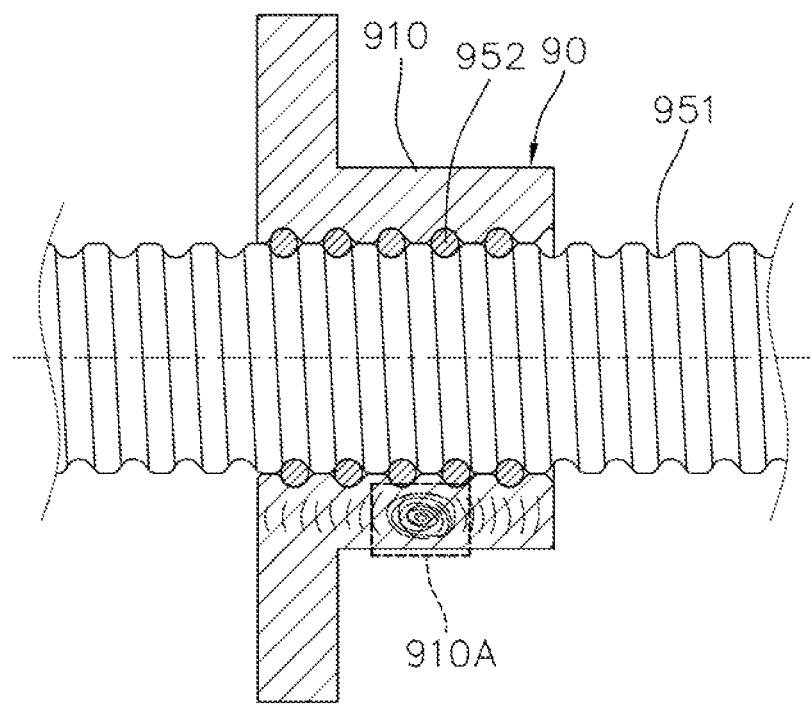
FIG. 13 shows the temperature change of the conventional nut moving on the ball screw.

FIG. 12 shows that multiple temperature sensing portions 60 are located between the threaded path 11 and the outer surface 12 of the nut 10 to sense temperature. The control portion 40 is connected with the temperature sensing portions 60 so as to individually control the micro fans 30 according to the temperature that is sensed. For example, when the temperature sensing portions 60 between the dual-narrowed paths 20 and the outer surfaces 12 detect the temperature to be 50 and 60 degrees Celsius, the control portion 40 controls the micro fans 30 in the different dual-narrowed paths 20 to generate different speeds to reduce the temperature respectively.

The nut 10 uses micro fans 30 to generate convection to reduce temperature that raises due to friction during the process of the linear movement of the nut 10 when the ball screw 51 is rotated. The micro fans 30 in the dual-narrowed paths 20 generate the air flows to reduce the temperature at the max-temp area 10A of the nut 10. Besides, the dual-narrowed paths 20 with the recesses 21 generate different air flows and increase the contact area between the air flows and the dual-narrowed paths 20. The efficiency for bringing heat away is increased.

Because the nut 10 is used for precision transmission so that it does not bear load, the dual-narrowed paths 20 do not affect the strength of the nut 10 and the weight of the nut 10 is reduced as well. The required input energy is also reduced because of the light in weight.

When the temperature of the nut 10 is increased, the heat affects the length of the nut 10 so that it cannot be precisely positioned and the precision of positioning of the system fails. The present invention uses micro fans 30 to generate air flows to keep the temperature of the nut 10 to reduce the errors due to high temperature and the precision of positioning and the life of use are increased.

While we have shown and described the embodiment in accordance with the present invention, it should be clear to those skilled in the art that further embodiments may be made without departing from the scope of the present invention.

What is claimed is:

1. A nut for a ball screw comprising:

a nut having an outer surface and a threaded path defined through the nut, and multiple dual-narrowed paths located between the threaded path and the outer surface of the nut, the dual-narrowed paths defined through a central axis of the nut and substantially being parallel to the threaded path, each of the dual-narrowed paths having a high-speed area and two low-speed areas, the high-speed area located between the two low-speed areas, a diameter of each of the dual-narrowed paths being reduced from two ends toward the high-speed area;

multiple micro fans disposed in, the dual-narrowed paths so as to drive air flows in the dual-narrowed paths to reduce temperature;

a control portion to control operation of the micro fans; and multiple temperature sensing portions disposed between the threaded path and the outer surface of the nut to sense temperature, the control portion connected with the temperature sensing portions so as to individually control the micro fans.

2. The nut as claimed in claim 1, wherein a diameter of the high-speed area of each of the dual-narrowed paths is reduced toward a center thereof.

3. The nut as claimed in claim 1, wherein a diameter of the high-speed area of each of the dual-narrowed paths is a fixed diameter.

4. The nut as claimed in claim 1, wherein the dual-narrowed paths each have multiple recesses defined in an inner periphery thereof.

5. The nut as claimed in claim 4, wherein multiple recesses are axially straight slots.

6. The nut as claimed in claim 4, wherein multiple recesses are substantially parallel annular grooves.

7. The nut as claimed in claim 4, wherein multiple recesses are formed spirally.

* * * * *